(12) United States Patent
Metzler et al.

(10) Patent No.: US 10,347,051 B2
(45) Date of Patent: Jul. 9, 2019

(54) NEAR FIELD MANEUVERING FOR AR-DEVICE USING IMAGE TRACKING

(71) Applicant: HEXAGON TECHNOLOGY CENTER GMBH, Heerbrugg (CH)

(72) Inventors: Bernhard Metzler, Dornbirn (AT); Martin Havnør, Oslo (NO); Rune Fjellvang, Oslo (NO)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 0 days.

(21) Appl. No.: 15/946,726

(22) Filed: Apr. 5, 2018

(65) Prior Publication Data

US 2018/0293801 A1 Oct. 11, 2018

(30) Foreign Application Priority Data

Apr. 6, 2017 (EP) .................................. 17165374

(51) Int. Cl.
| | |
|---|---|
| *G06T 19/00* | (2011.01) |
| *G06K 7/14* | (2006.01) |
| *G06T 7/73* | (2017.01) |
| *G06K 19/06* | (2006.01) |

(52) U.S. Cl.
CPC .......... *G06T 19/006* (2013.01); *G06K 7/1417* (2013.01); *G06K 7/1456* (2013.01); *G06K 19/06037* (2013.01); *G06T 7/74* (2017.01); *G06T 2207/30204* (2013.01); *G06T 2207/30244* (2013.01)

(58) Field of Classification Search
None
See application file for complete search history.

(56) References Cited

U.S. PATENT DOCUMENTS

| | | | |
|---|---|---|---|
| 2012/0075343 A1* | 3/2012 | Chen | G09G 5/397 345/633 |
| 2013/0141461 A1 | 6/2013 | Salter et al. | |
| 2014/0210856 A1* | 7/2014 | Finn | G01C 15/002 345/633 |

(Continued)

OTHER PUBLICATIONS

Extended European Search Report dated Aug. 2, 2017 as received in Application No. 17165374.4.

*Primary Examiner* — Kee M Tung
*Assistant Examiner* — Yanna Wu
(74) *Attorney, Agent, or Firm* — Maschoff Brennan

(57) ABSTRACT

An Augmented Reality (AR)-system comprising a permanent marker having a defined pose relative to a coordinate system, an AR-device having a camera and a processing unit, wherein the AR-device is configured to visually detect and identify the permanent marker, determine a relative pose between the AR-device and the permanent marker, a temporary marker having a coded design and an undefined pose relative to the coordinate system and the permanent marker, wherein the AR-device is configured to visually detect and identify the temporary marker by the coded design, determine a relative pose between the permanent marker and the temporary marker, based on the determined relative pose between the permanent marker and the temporary marker, defining a pose of the temporary marker relative to the coordinate system, determine a relative pose between the AR-device and the temporary marker.

10 Claims, 2 Drawing Sheets

(56) References Cited

U.S. PATENT DOCUMENTS

2016/0005174 A1* 1/2016 Ellsworth ................. G06T 7/73
                                                    382/103
2016/0242744 A1   8/2016 Mihailescu et al.
2018/0101964 A1* 4/2018 Lee ........................... G06T 7/70

* cited by examiner

NEAR FIELD MANEUVERING FOR AR-DEVICE USING IMAGE TRACKING

CROSS-REFERENCE TO RELATED APPLICATIONS

This application claims priority to European Patent Application No. 17165374.4 filed on Apr. 6, 2017, which is incorporated herein by reference.

FIELD OF INVENTION

The present invention relates to an AR-system. More particularly, the present invention relates to an Augmented Reality (AR)-system intended and configured for use in the field of at least one of metrology, geodesy, and civil engineering.

BACKGROUND OF INVENTION

The technical fields of the present invention are metrology, geodesy and civil engineering. In these arts, Augmented Reality (AR) systems are often utilised for supporting users on a site by referenced visualisations.

Such AR-systems usually comprise at least one marker which is precisely arranged in a pre-defined pose relative to a coordinate system, which an AR-device, such as an AR-helmet, AR-glasses or a tablet/smart phone, may reference itself to by means of the marker. Once locked in (or in other words: "logged" in) into the coordinate system, the AR-device is able to display virtual objects with a precise spatial link to the coordinate system, i.e. to the natural environment. The locked-in-status usually must be maintained continuously by scanning the marker again and again.

When the user is approaching the marker, the field of view of the camera of the AR-device captures less of the environment and at one point, the camera threatens to lose track of the marker. After losing sight of the marker, AR-devices known in the art may still be able to maintain a locked-in-status with help of position and orientation sensors, e.g. an inertial measurement unit (IMU) comprising an accelerometer and/or a gyroscope, or with help of camera image based localisation algorithms. However, such compensatory measures are exposed to accumulation of errors and therefore cannot encounter high precision standards.

Therefore, the invention proposes a situational, temporary high-precision extension of the range of usability of such AR-systems.

BRIEF SUMMARY OF INVENTION

Some embodiments of the invention relates to an Augmented Reality (AR) system comprising a permanent marker having a defined pose relative to a coordinate system, an AR-device comprising a camera and a processing unit, wherein the AR-device is configured to visually detect and identify the permanent marker by the coded design, determine a relative pose between the AR-device and the permanent marker, wherein a temporary marker having a coded design and an undefined pose relative to the coordinate system and the permanent marker, wherein the AR-device is configured to visually detect and identify the temporary marker by the coded design, determine a relative pose between the permanent marker and the temporary marker, based on the determined relative pose between the permanent marker and the temporary marker, defining a pose of the temporary marker relative to the coordinate system, determine a relative pose between the AR-device and the temporary marker.

The AR-device may comprise one or more of an orientation sensor configured to provide supportive orientation data and a display for augmenting a view of the coordinate system with a virtual model.

The temporary marker may be embodied as an attachable tape and the coded design may be embodied as a two-dimensional code or a composition of two-dimensional codes, like e.g. Quick Response (QR) codes, Aztec codes, or of an absolute-coded barcode.

Some embodiments of the invention further relates to a method of spatially interrelating an Augmented Reality (AR) device relative to a coordinate system, wherein the AR-device comprises a camera and a processing unit and is configured to implement the steps: visually detecting and identifying a permanent marker, wherein the permanent marker has a defined pose relative to the coordinate system, determining a relative pose between the AR-device and the permanent marker, visually detecting and identifying a temporary marker by a coded design, wherein the temporary marker has an undefined pose relative to the coordinate system, determining a relative pose between the permanent marker and the temporary marker, defining a pose of the temporary marker relative to the coordinate system, and determining a relative pose between the AR-device and the temporary marker.

In particular, during detecting and identifying the temporary marker, the permanent marker and the temporary marker are both situated within the field of view of the camera. During determining a relative pose between the AR-device and the temporary marker, the permanent marker may be situated outside the field of view of the camera, while the temporary marker is situated within the field of view of the camera.

Determining the relative poses respectively may comprise using an image based localisation by processing images obtained with the camera. Determining the relative poses respectively may comprise using resection, in particular using a Simultaneous Localisation and Mapping (SLAM) algorithm. Determining the relative poses respectively may comprise using supportive orientation data obtained by an orientation sensor comprised by the AR-device.

Some embodiments of the invention further relates to a use of a temporary marker in an Augmented Reality (AR) system for temporarily extending the range of usability of the AR-system, wherein the AR-system comprises a permanent marker having a defined pose relative to a coordinate system, an AR-device comprising a camera and a processing unit, wherein the AR-device is configured to visually detect and identify the permanent marker, determine a relative pose between the AR-device and the permanent marker, wherein the temporary marker has a coded design and an undefined pose relative to the coordinate system, by the coded design, is visually detectable and identifiable by the AR-device, and is used by the AR-device to determine a relative pose between the permanent marker and the temporary marker, define a pose of the temporary marker relative to the coordinate system, and determine a relative pose between the AR-device and the temporary marker.

The temporary marker may be used by the AR-device to determine a relative pose between the AR-device and the temporary marker when the permanent marker is situated outside the field of view of the camera, and the temporary marker is situated within the field of view of the camera.

The temporary marker may comprise a composition of Quick Response (QR) codes or any other pattern composition with absolute coding. Such patterns may have any form or colour, for example individual stripes in black and white. The temporary marker may be embodied as a tape or a chain of rectangular sheets. The temporary marker may be attachable to an object by comprising fastening means such as adhesive, a magnet component, hook-and-loop-fastener, or a pin.

DESCRIPTION OF THE DRAWINGS

In the following, the invention will be described in detail by referring to exemplary embodiments that are accompanied by figures, in which.

DETAILED DESCRIPTION

Figure 1:
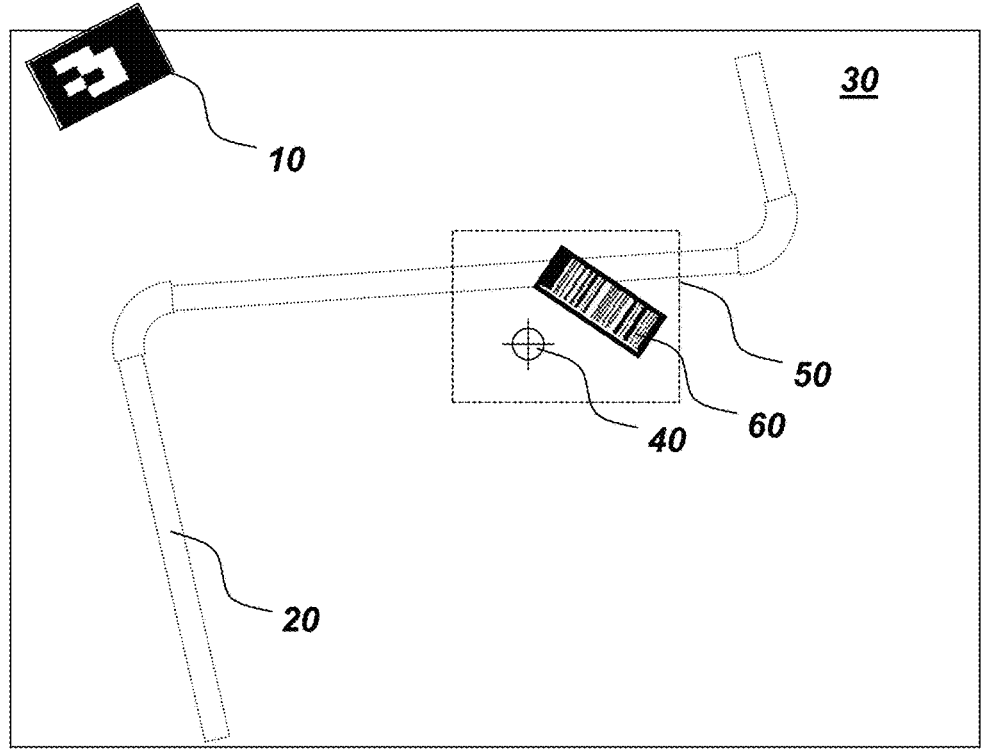
FIG. 1: shows a first embodiment of the present invention based on a GPR scanned structure in which an AR-system provides visualisations with help of temporary markers.

For example, the invention may be embodied according to FIG. 1 (bird's eye view) in an area that is scanned by GPR (Ground Penetrating Radar) in order to capture rebars, cables, pipes, voids or similar elements 20 inside a concrete structure 30. The recorded scan data are linked to a coordinate system. After the scan is complete, the results are processed and distributed to an AR-device for displaying AR-objects (virtual models, photographs, text, animations, etc.) and thereby supporting the user of the AR-device in operations such as drilling. The AR-device may be a smart helmet, smart glasses, a tablet, a smart phone or similar.

A marker 10 for recognition and referencing is placed within the scanning site. This marker is permanent, i.e. usually fixed for a longer term in a defined pose relative to the coordinate system, and may be made of sustainable material since the environment may be harsh. Exemplarily, the permanent marker is shown herein comprising a QR-code, however, any other code or characteristic pattern stored in the AR-system may be applied. Also, the permanent marker may be embodied as one or more natural objects within the scene, e.g. one ore more of: a monument, a building, a characteristic part of a building, a corner of a window and anything that is of a permanent and known structure which can be recognised by its features.

In case the user wearing the AR-device moves closer to the concrete structure 20, e.g. for drilling a hole 40 into the structure, the camera of the AR-device will eventually lose track of the permanent marker 10 due to limited field of view 50. Maintenance of a referencing relative to the environment (i.e. the coordinate system) may still be performed using a combination of visual inertial solutions, inertial measuring unit (IMU), compass and/or GPS, in particular by sensor fusion. The accuracy will however not be sufficient over time for the drilling operator to ensure safe operation and avoiding cutting pipes, rebars or drilling holes in voids. Also, a popular method to bridging time periods without referencing, i.e. the use of magnetometers, has the downside of interference with metals in the surroundings which leads to large deviations.

To overcome this problem, a temporary marker 60, such as a tape, may be deployed on the surface of the structure, wherein the temporary marker shows on its surface a code recognisable by the AR-device. In particular, a pseudo-random code (e.g. a linear code as it is used on rods for digital levels) can be used, the advantage of which is the invariance to scale, i.e. the code can be interpreted correctly and unambiguously also from larger distances. Moreover, based on such a linear absolute-code pattern, the distance between camera and tape can be measured, too.

Instead of the exemplarily named linear code, the temporary markers may also show semi-random 5×5 QR codes on its surface, or any other pattern recognisable by and stored on the AR-device.

Preferably, the user may place the temporary marker 60 close to the point of interest 40 (where he wants to perform a job like drilling a hole). From a perspective where the camera of the AR-device still captures the permanent marker 10 within its field of view 50, the user may estimate a location to place the temporary marker 60. This location should be within the field of view of the camera when the user is performing his operation. The exact place of the temporary marker however is not crucial: once placed at the estimated location, it may have an undefined position and orientation relative to the coordinate system.

Thereupon taking some steps back in order to get the permanent marker 10 and the temporary marker 60 into the field of view of the camera, according to the invention, a calibration of the temporary marker 60 is performed by the AR-device. Once the permanent marker 10 comes into the field of view of the AR-device, the AR-device references itself relative to the coordinate system. The code of the temporary marker 60 is stored in the AR-system (e.g. in a cloud computer, or in the AR-device) to make the AR-device capable of recognising (detecting and identifying) the temporary marker 60.

Once recognised, the AR-device determines a pose of the temporary marker 60 relative to the permanent marker 10, or, respectively, relative to the coordinate system. This is done by means of image processing, e.g. feature tracking in combination with image resection.

Based on the determined relative pose between the permanent marker 10 and the temporary marker 60, the AR-device defines the pose of the temporary marker 60 relative to the coordinate system, and is from this time on capable of referencing its own pose relative to the coordinate system via the temporary marker 60. By calibrating the temporary marker 60, so to speak, the temporary marker is "made permanent" because from then on it is not only known in appearance, but also has a determined (hence: defined) pose relative to the coordinate system. That is why the calibrated temporary marker may even be used to calibrate a further temporary marker and therewith step by step to extend the range of usability of the AR-system.

This calibration process allows for near field maneuvering for the user (near field, the permanent marker 10 is not detectable by the AR-device, but the temporary marker 60 is). During the user's operation near field, the AR-device references itself in every instant (6 degrees of freedom of the AR-device) relative to the coordinate system by image tracking of the temporary marker 60. This allows for continuously displaying AR elements 20 (rebars, cables, pipes, etc.) on the AR-device with high accuracy.

A regular 5×5 QR code tape (ref 62 in FIG. 3) has no repeated patterns per approximately 100 meter, which makes it as well suitable for being deployed in said near field operations where it may be used in a range of 0.2 to 3 meters distance.

Figure 2:
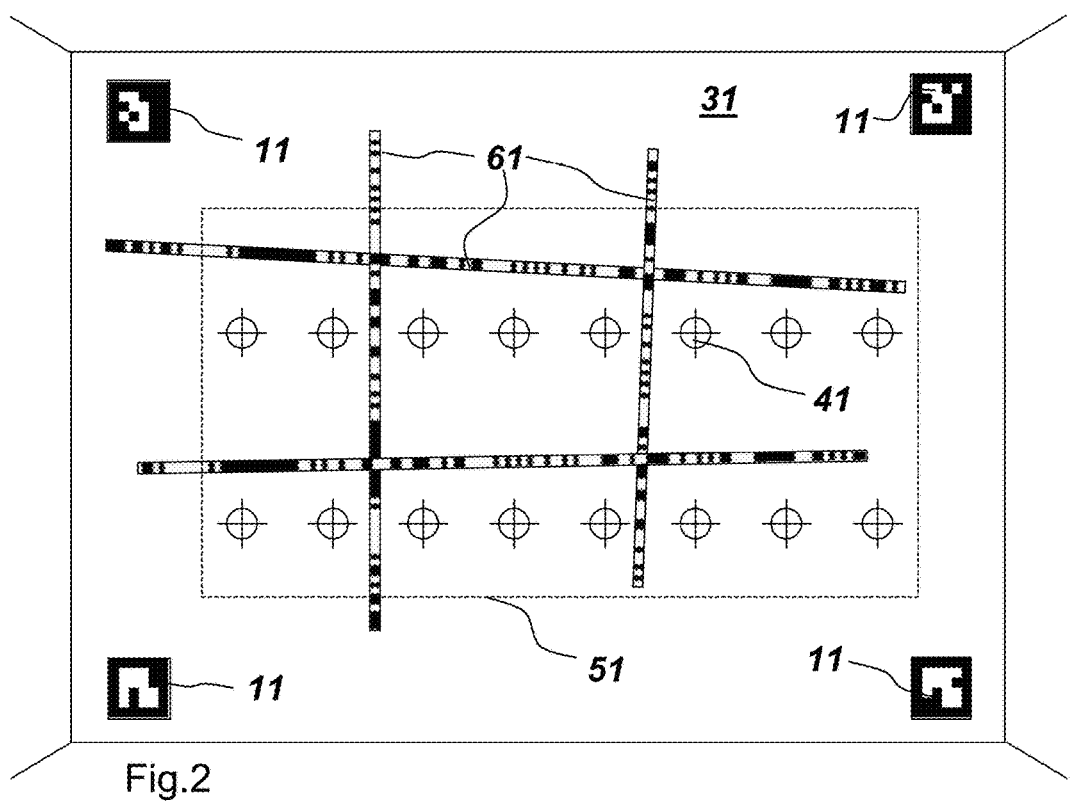
FIG. 2: shows a second embodiment of the present invention based on a wall in a building in which an AR-system provides visualisations with help of temporary markers.

Another example for embodying the invention may be an in-door construction site. FIG. 2 shows a frontal view of a wall as an object 31 within a building. In this scene, the user has the task to drill holes 41 with an equal distance along two horizontal lines on the wall.

As permanent marker 11, a set of four QR-codes is installed on a wall. The pose of the permanent marker 11 is pre-defined with reference to a coordinate system and therefore known to the AR-system. AR elements are spatially linked to said coordinate system and displayable on an AR-device. In order to densify the markers on the wall for enabling the AR-device to spatially interrelate itself relative to the coordinate system, one or more coded tapes 61 are temporarily attached to the wall in an undefined manner (undefined means that the tapes are arbitrarily placed and not specifically aligned relative to the coordinate system). These tapes 61 or every single one of the tapes act as temporary marker.

Based on a calibration process using the code on the tape, the temporary marker is referenced with respect to the coordinate system defined by the permanent markers, when the AR-device has both permanent 11 and temporary markers 61 in its field of view.

From then on, the AR-device may lock itself in to the coordinate system for correctly showing the drill holes 41 and other AR elements such as electrical wire, when the AR-device has only the temporary markers 61 in its field of view 51. In order to overlay data given in the coordinate system on an AR-device, not only the permanent marker 11 but also or alternatively the temporary markers 61 may be used to reference the AR-device with respect to the coordinate system, i.e. the position and orientation (6-degrees-of-freedom) of the AR-device with respect to the reference coordinate system are determined.

For this purpose it is sufficient that the camera of the AR-device only observes a portion of the whole hash setup of temporary markers 61 as indicated in FIG. 2. Referencing can be performed by applying algorithms from photogrammetry or computer vision, e.g. resection.

The method described herein may additionally, i.e. supportingly, use a Simultaneous Localisation and Mapping (SLAM) process or structure-from-motion process. Within these processes, the function of the temporary marker is to provide a texture on the wall. During the SLAM process, the temporary marker itself or intersections of several tapes of the temporary marker may be detected in the image of the camera of the AR-device as corner points which are then tracked or matched from one frame to another. During the SLAM process their 3D-coordinates are determined in the coordinate system, e.g. by forward-intersection, and used for determining the position and the orientation of the AR-device.

Figure 3:
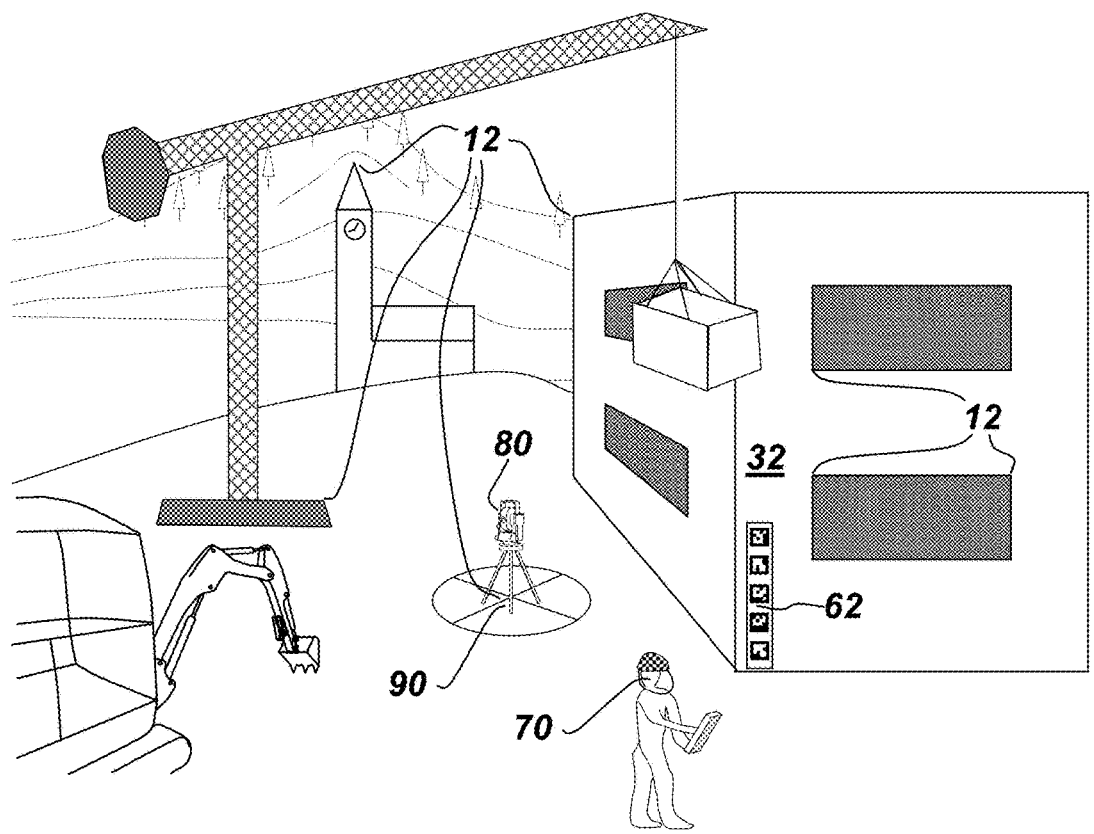
FIG. 3: shows two embodiments of a temporary marker.

FIG. 3 shows an exemplary AR-system according to the invention, wherein the permanent marker 12 is embodied as a set of landmarks of which the exact position is known (=defined). When the AR-device 70 captures at least three of those landmarks with its camera, the pose (position and orientation) of the permanent marker can be determined. For example, the church spire shown in FIG. 3 may be part of the permanent marker if its position is known relative to the coordinate system of the AR-system. As further examples, the foot of the crane, corners of buildings or corners of windows of a building may also be part of the permanent marker. Any object that is fixed in place at the site and that has a defined or definable position can act as landmark. A landmark can also be a coded badge, just as embodied as the temporary marker described herein.

The at least three landmarks may be surveyed with a surveying instrument in order to determine and define the position of the permanent marker. Since within a construction site, these surveying instruments are often positioned on a known absolute position 90, the surveying instrument 80 itself or its position may also be regarded as a landmark.

The positions of the landmarks relative to the coordinate system are stored within the AR-system (e.g. in a cloud computer, or in the AR-device) to make the AR-device capable of recognising (detecting and identifying) the permanent marker.

Accordingly, also three different and separately positioned coded markers as the landmarks may form a permanent marker, wherein at least the positions of those three markers are known with respect to the coordinate system. This will ease determining a relative pose between the permanent marker and the temporary marker or the AR-device from far distances. Even though it might be possible to detect and identify the temporary marker by the coded design, the resolution of the camera might not be sufficient to accurately detect the pose of a single coded marker. In combination of three coded markers (together forming the permanent marker), however, it is possible to determine a relative pose more easily.

For an operation close the wall 32 of the building, sight of the permanent markers would be lost, which is why a temporary marker 62 is attached close to the place where the operation needs to be performed. Having the permanent marker 12, i.e. at least three landmarks or coded markers, and the temporary marker 62 in the field of view of the camera, the AR-device is determining a relative pose between the permanent and the temporary marker. By this, the pose of the temporary marker 62 relative to the coordinate system is defined. The AR-system "learns" the pose of the temporary marker and from then on may tread it like a permanent marker. Additionally to the appearance of the temporary marker 62, which has been known before, now the AR-system also may store the pose of the temporary marker 62. Hence, the AR-device may be referenced relative to the coordinate system provided by the temporary marker 62 only. The permanent marker 12 does not necessarily have to be in sight of the camera.

Figure 4:
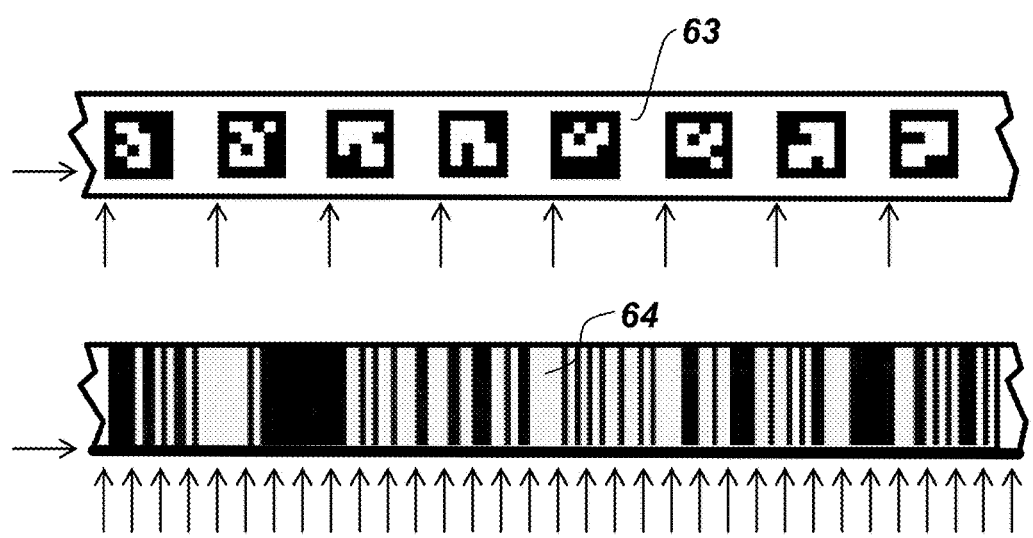
FIG. 4: shows two embodiments of a temporary marker which may be used in an AR-system for temporarily extending the range of usability of the AR-system.

FIG. 4 shows two embodiments 63, 64 of a temporary marker which may be used in an AR-system for temporarily extending the range of usability of the AR-system, according to the above description.

Temporary markers as they are described herein may as well be used in an alternative use case: A temporary marker is placed within a scene, thus taking up an undefined pose. In said scene, AR-data are to be made available for an AR-device. The AR-device is going to use only the temporary marker as means for referencing relative to the scene. A permanent marker as a global or absolute reference is not required within this use case. The AR-data are then acquired by capturing a numerical representation of the scene, e.g. a point cloud by a laser scanner or a ground penetrating radar device. The numerical representation is immediately linked to the temporary marker, which is also captured. The spatial relationship between the numerical representation and the temporary marker is thus defined. AR-data comprising at least part of the numerical representation are provided to the AR-device. The AR-device visually detects and identifies the temporary marker by its coded design, and determines a relative pose between the temporary marker and the AR-device. Based on this relative pose, the AR-data can be overlaid on the AR-device in a spatially referenced way with respect to the scene. This use case is especially useful when a Building Information Modeling (BIM)-model of a construction site is not yet available. In this way, the temporary marker can be utilised to provide "temporary" reference system "on-the-fly".

Although the invention is illustrated above, partly with reference to some preferred embodiments, it must be understood that numerous modifications and combinations of different features of the embodiments can be made. All of these modifications lie within the scope of the appended claims.

The invention claimed is:

1. An Augmented Reality (AR)-system comprising:
a permanent marker having a defined pose relative to a coordinate system,
a temporary marker having a coded design and an undefined pose relative to the coordinate system and the permanent marker,
an AR-device having a camera, a display, and a processing unit, wherein the AR-device is configured to:
visually detect and identify the permanent marker using the camera,
determine a relative pose between the AR-device and the permanent marker in the coordinate system,
visually detect and identify the temporary marker by the coded design using the camera,
determine a relative pose between the permanent marker and the temporary marker,
based on the determined relative pose between the permanent marker and the temporary marker, defining a pose of the temporary marker relative to the coordinate system,
based on the defined pose of the temporary marker relative to the coordinate system, determine a relative pose between the AR-device and the temporary marker, and
overlaying AR elements on the display based on the relative pose between the AR device and the temporary marker, when the camera has only the temporary marker in its field of view.

2. The AR-system according to claim 1, wherein the AR-device comprises a position and orientation sensor configured to provide supportive position and orientation data.

3. The AR-system according to claim 1, wherein the permanent marker:
has a coded design, or
is a set of at least three landmarks, wherein each landmark has a defined position.

4. The AR-system according to claim 1, wherein the temporary marker comprises one or more of:
a tape or a chain of rectangular sheets,
a composition of Quick Response (QR) codes or an absolute-coded stripe pattern, and
an attachment means.

5. A method of spatially interrelating an Augmented Reality (AR)-device relative to a coordinate system, wherein the AR-device comprises a camera, a display, and a processing unit, the method comprising:
visually detecting and identifying a permanent marker using the camera, wherein the permanent marker has a defined pose relative to the coordinate system;
determining a relative pose between the AR-device and the permanent marker in the coordinate system;
visually detecting and identifying a temporary marker by a coded design using the camera, wherein the temporary marker has an undefined pose relative to the coordinate system;
determining a relative pose between the permanent marker and the temporary marker;
based on the determined relative pose between the permanent marker and the temporary marker, defining a pose of the temporary marker relative to the coordinate system;
based on the defined pose of the temporary marker relative to the coordinate system, determine a relative pose between the AR-device and the temporary marker, and
overlaying AR elements on the display based on the relative pose between the AR device and the temporary marker, when the camera has only the temporary marker in its field of view.

6. The method according to claim 5, wherein during determining a relative pose between the permanent marker and the temporary marker, the permanent marker and the temporary marker are both situated within the field of view of the camera.

7. The method according to claim 5, wherein during determining a relative pose between the AR-device and the temporary marker, the permanent marker is situated outside or within the field of view of the camera, and the temporary marker is situated within the field of view of the camera.

8. The method according to claim 5, wherein determining the relative poses respectively comprises using an image based localisation by processing images obtained with the camera.

9. The method according to claim 5, wherein determining the relative poses respectively comprises using an algorithm selected from resection or Simultaneous Localization and Mapping (SLAM).

10. The method according to claim 5, wherein determining the relative poses respectively comprises using supportive position and orientation data obtained by a position and orientation sensor comprised by the AR-device.

* * * * *